United States Patent [19]

Knights et al.

[11] 4,412,332

[45] Oct. 25, 1983

[54] HIGH EFFICIENCY STORAGE LASER

[75] Inventors: Mark G. Knights, Brookline; Evan P. Chicklis, Nashua, both of N.H.

[73] Assignee: Sanders Associates, Inc., Nashua, N.H.

[21] Appl. No.: 244,375

[22] Filed: Mar. 16, 1981

[51] Int. Cl.³ .............................................. H01S 3/091
[52] U.S. Cl. ...................................... 372/70; 372/80; 372/57; 372/41
[58] Field of Search ...................... 372/80, 57, 70, 39, 372/41, 69

[56] References Cited

U.S. PATENT DOCUMENTS

| 3,451,010 | 6/1969 | Maiman | 372/70 |
| 3,783,403 | 1/1974 | Hook et al. | 372/70 |
| 4,284,962 | 8/1981 | Esterowitz et al. | 372/70 |

OTHER PUBLICATIONS

"Electron Beam Pumped Broad-Band Diatomic and Triatomic Excimer Lasers", by Tittel et al., *IEEE Jour. Quant. Elect.*, vol. QE-17, No. 12, Dec. 1981.
"Photolytic Pumping of the iodine Laser by XeBr*", Swingle et al., *App. Phys. Lett.*, vol. 28, No. 7, Apr. 1, 1976.
Multijoule Performance of Photolytically Pumped XeF(C→A) Laser; IEEE Jour. Quant. Elect., vol. QE-18, No. 2, Feb. 1982, Eckstrom et al.
"Observations of Gain and Laser Oscillation in the Blue-Green During Direct Pumping of XeF by Nureosecond Electron Beam Pulses", Campbell et al., App. Phys. Lett. 37(4), Aug. 80.

Primary Examiner—James W. Davie
Assistant Examiner—Léon Scott, Jr.
Attorney, Agent, or Firm—Louis Etlinger; Richard I. Seligman

[57] ABSTRACT

A high efficiency storage laser is achieved by pumping a Tm:LiYF$_4$ laser from an electrically excited XeBr* fluorescer.

2 Claims, 1 Drawing Figure

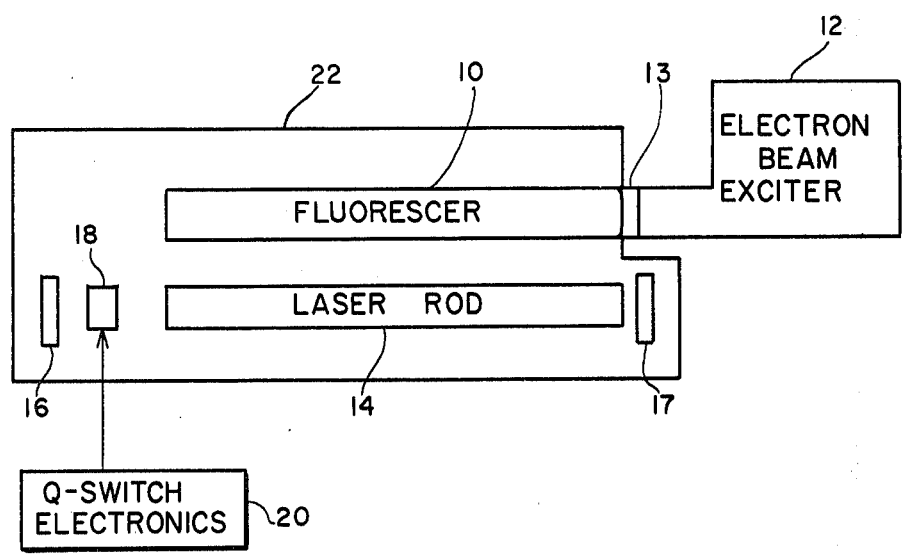

HIGH EFFICIENCY STORAGE LASER

BACKGROUND OF THE INVENTION

This invention relates to lasers, and more particularly, to high efficiency storage lasers.

There are many requirements for high efficiency lasers which emit in the infrared and visible portion of the spectrum. Very few of the presently available lasers meet this requirement. Conventional solid state lasers generally employ broad band black body pump sources such as xenon flash lamps. These lamps are highly efficient in the conversion of electrical to optical energy (typically 30%). However, to efficiently couple to such sources it is necessary that the laser medium have absorption bands which match the broad band emission of the pump source. There are very few solid state materials in this category with Neodyium (Nd) being the most often used. Nd, however emits only in the infrared and at best has an efficiency on the order of 2%.

Most laser materials and particularly those using rare earths (the bulk of solid state lasers) tend to have isolated narrow absorption bands. In order to improve efficiency for such lasers it has been proposed to resonantly pump rare earth lasers such as Er:LiYF$_4$, Er-Ho:LiYF$_4$ and Er-Ho:LiYF$_4$ with the output from a doubled Nd:YAG laser. This is disclosed in U.S. patent application Ser. No. 953,243, filed Oct. 20, 1978 and assigned to assignee of the present application. Improving efficiency in this manner only works if the pump laser itself is efficient and there are only a very few which suffice.

Accordingly, it is an object of the present invention to provide a high efficiency laser.

It is another object of this invention to provide a high efficiency laser which emits in the visible.

SUMMARY OF THE INVENTION

Briefly, a high efficiency laser is provided by using a rare gas halide (RGH) fluorescer, which is electrically excited, to pump a solid state laser. In particular an XeBr* fluorescer is employed to pump a Tm:LiYF$_4$ laser. The use of an RGH fluorescer is a desirable alternative to laser pumping of storage media. The rare gas halide mix is excited electrically and then allowed to radiate spontaneously with no attempt made to lase the excited mixture. The spontaneous emitted photons are used to pump the solid storage medium.

One attribute of a fluorescer system which is advantageous for solid pumping is the increased emission bandwidth over that of a laser. Absorption in the solids of interest appears in bands of varied spectral width, so the extremely narrow line width of a laser is not strictly necessary. In fact, where an emission line falls on the tail of an absorption peak, increased linewidth could prove beneficial.

BRIEF DESCRIPTION OF THE DRAWING

The above-mentioned and other features and objects of this invention will become more apparent by reference to the following description taken in conjunction with the accompanying drawing which is a perspective illustration of an RGH fluorescer pumped solid state laser system.

DESCRIPTION OF A PREFERRED EMBODIMENT

In order to obtain high efficiency laser radiation in the visible and infrared portion of the spectrum an electrically excited XeBr* fluorescer is employed to pump a Tm:LiYF$_4$ laser rod. Such an arrangement is illustrated in the drawing. The laser pump comprises a gas tube 10 containing XeBr* which receives an output from a source of electrical excitation 12 in conventional fashion. The electron beam from exciter 12 is applied to gas tube 10 via a foil 13 which permits electron flow therethrough but seals the XeBr gas. The radiation emitted from the XeBr* gas tube 10 is applied to a Tm:LiYF$_4$ laser rod 14. Laser rod 14 is contained within a resonant cavity formed by mirrors 16 and 17. A Q-switch 18 operated in conventional fashion from Q-switch electronics 20 is used when very short pulses are desired. The invention is also useful in an amplifier arrangement wherein the laser would be driven by another short pulse laser.

The gas tube 10 and laser rod 14, including the resonant cavity, is disposed within a housing 22. For purposes of clarity the means for retaining the gas tube and laser in housing 22 is omitted. Housing 22 is preferably elliptical in shape and the gas tube 10 and laser rod 14 are preferably disposed at the foci of the ellipse. The internal surface of the housing 22 is polished so as to be highly reflective at the emission wavelength (280 nanometers) of the XeBr* fluorescer. Polished aluminum, for example, may be used.

It should be noted that no resonator mirrors are employed with the gas tube 10 as the XeBr* is allowed to radiate spontaneously and no attempt is made to lase the excited mixture. The spontaneously emitted photons are used to pump the solid storage medium. The XeBr* fluorescer is ideally suited as a pump for a Tm:LiYF$_4$ rod to provide a high efficiency laser. The XeBr* fluorescer when under electron beam excitation outputs a long pulse, on the order of one microsecond, and this can be entirely stored by the Tm:LiYF$_4$ rod since the upper state thereof is long lived. This large amount of stored energy can be obtained from the laser in a short pulse. This provides a very efficient laser.

The efficiency of the electrical to fluorescent conversion is approximately fifteen percent (15%). Approximately forty to fifty percent (40-50%) of the fluorescene can be converted to output energy from the Tm:LiYF$_4$ rod, thereby providing an overall efficiency on the order of six to seven percent (6-7%) which is much greater than the efficiency of flashlamp pumped lasers which generally have an efficiency on the order of one percent (1%), two to three percent (2-3%) under ideal optical conditions.

While we have described above the principles of our invention in connection with specific apparatus, it is to be clearly understood that this description is made only by way of example and not as a limitation of the scope of our invention as set forth in the accompanying claims.

We claim:
1. A high efficiency storage laser, comprising:
   a resonant cavity;
   means for extracting energy from said cavity;
   a solid state Tm:LiYF$_4$ crystal disposed in said cavity; and
   pump means including an XeBr* mixture and an electron beam exciter for supplying energy to the XeBr* mixture to cause the XeBr* mixture to spontaneously emit sufficient radiation within the absorption band of the Tm:LiYF$_4$ crystal to cause lasing; and
   means for supplying the radiation from the spontaneously emitting fluorescer to said crystal.
2. A high efficiency storage laser as defined in claim 1, further including a housing containing said resonant cavity, said Tm:LiYF$_4$ rod and said XeBr* mixture.

* * * * *